(12) United States Patent
Woo et al.

(10) Patent No.: US 11,789,457 B1
(45) Date of Patent: Oct. 17, 2023

(54) SYSTEM FOR COLLISION DETECTION IN AUTONOMOUS MOBILE DEVICE

(71) Applicant: AMAZON TECHNOLOGIES, INC., Seattle, WA (US)

(72) Inventors: Byoungsam Woo, San Jose, CA (US); Srivatsan Kandadai, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 871 days.

(21) Appl. No.: 16/710,718

(22) Filed: Dec. 11, 2019

(51) Int. Cl.
| | |
|---|---|
| *G05D 1/02* | (2020.01) |
| *G10L 21/0208* | (2013.01) |
| *H04R 3/00* | (2006.01) |
| *G05D 1/00* | (2006.01) |
| *G01S 15/931* | (2020.01) |
| *H04R 3/02* | (2006.01) |

(52) U.S. Cl.
CPC ............ *G05D 1/0255* (2013.01); *G01S 15/931* (2013.01); *G05D 1/0088* (2013.01); *G10L 21/0208* (2013.01); *H04R 3/005* (2013.01); *H04R 3/02* (2013.01); *G10L 2021/02082* (2013.01)

(58) Field of Classification Search
CPC ... G05D 1/0255; G05D 1/0088; G01S 15/931; G10L 21/0208; G10L 2021/02082; H04R 3/005; H04R 3/02
See application file for complete search history.

(56) References Cited

U.S. PATENT DOCUMENTS

| | | | | |
|---|---|---|---|---|
| 9,555,883 | B1* | 1/2017 | Navot et al. | B64C 39/02 |
| 2016/0125746 | A1* | 5/2016 | Kunzi et al. | G01S 7/003 |
| | | | | 701/11 |
| 2017/0182405 | A1* | 6/2017 | Holmes et al. | F41B 15/02 |
| 2019/0035288 | A1* | 1/2019 | Beltman et al. | G01S 11/14 |
| 2019/0129423 | A1* | 5/2019 | Matus, Jr. et al. | G05D 1/0088 |
| 2019/0210516 | A1* | 7/2019 | Sata | G08G 1/096775 |
| 2020/0130864 | A1* | 4/2020 | Brockers et al. | B60L 53/12 |
| 2022/0238131 | A1* | 7/2022 | Park | G10L 25/18 |

OTHER PUBLICATIONS

HE et al., "Perception of Bump and Making a Response in an Autonomous Wheeled Mobile Robot", INFO NA, Portal Komunikacji Naukowej, Retrieved from the internet: https://www.infona.pl/resource/bwmeta1.element.ieee-art-000004026178.

Paller, "My life with Android :-): Detecting speed bumps with accelerometer", Feb. 19, 2013, Retrieved from Internet: https://mylifewithandroid.blogspot.com/2013/02/detecting-speed-bumps-with-accelerometer.html.

Stack Overflow, "How to use accelerometer sensor to detect and match two toy cars' collision", 2015, Retrieved from the Internet: https://stackoverflow.com/questions/30814257/how-to-use-accelerometer-sensor-to-detect-and-match-two-toy-cars-collision.

* cited by examiner

*Primary Examiner* — Daniel R Sellers
(74) *Attorney, Agent, or Firm* — Lindauer Law, PLLC

(57) ABSTRACT

An autonomous mobile device (AMD) moves through a physical space without human intervention. Data from sensors on the AMD is used to determine if the AMD has collided with an obstacle. In one implementation the sensors may include a microphone. A collision may produce in the structure of the AMD a characteristic sound that is detected by the microphone and recognized as indicative of a collision. In another implementation information about velocity of the AMD and output from an inertial measurement unit (IMU) may be used to determine a characteristic change in motion that is indicative of a collision. Data from the microphone and the IMU may be combined to improve the reliability of collision detection.

20 Claims, 8 Drawing Sheets

500

| COLLISION PROFILE DATA 140 |||
|---|---|---|
| COLLISION TYPE 502 | MOTION PROFILE DATA 504 | AUDIO SPECTRUM DATA 506 |
| SOFT OBJECT | | |
| MEDIUM OBJECT | | |
| HARD OBJECT | | |
| FIXED OBJECT | | |
| MOVEABLE OBJECT | | |

...

| THRESHOLD DATA 142 |||||
|---|---|---|---|---|
| MAP REGION 508 | FLOOR TYPE 510 | ACCELERATION THRESHOLD (M/S$^2$) 512 | ANGULAR RATE THRESHOLD 514 | AUDIO THRESHOLD 516 |
| LIVING ROOM | DEEP PILE CARPET | 0.1 | 10 | 30 |
| ENTRYWAY | TEXTURED TILE | .2 | 15 | 217 |
| HALLWAY | SMOOTH WOOD | .3 | 20 | 170 |
| GARAGE | CONCRETE | .27 | 17 | 195 |

SYSTEM FOR COLLISION DETECTION IN AUTONOMOUS MOBILE DEVICE

BACKGROUND

An autonomous mobile device (AMD) moves throughout a physical space. While moving, obstacles may collide with the AMD.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 5 illustrates collision profile data and threshold data that may be used to determine, and in some implementations characterize, a collision, according to some implementations.

Figure 1:
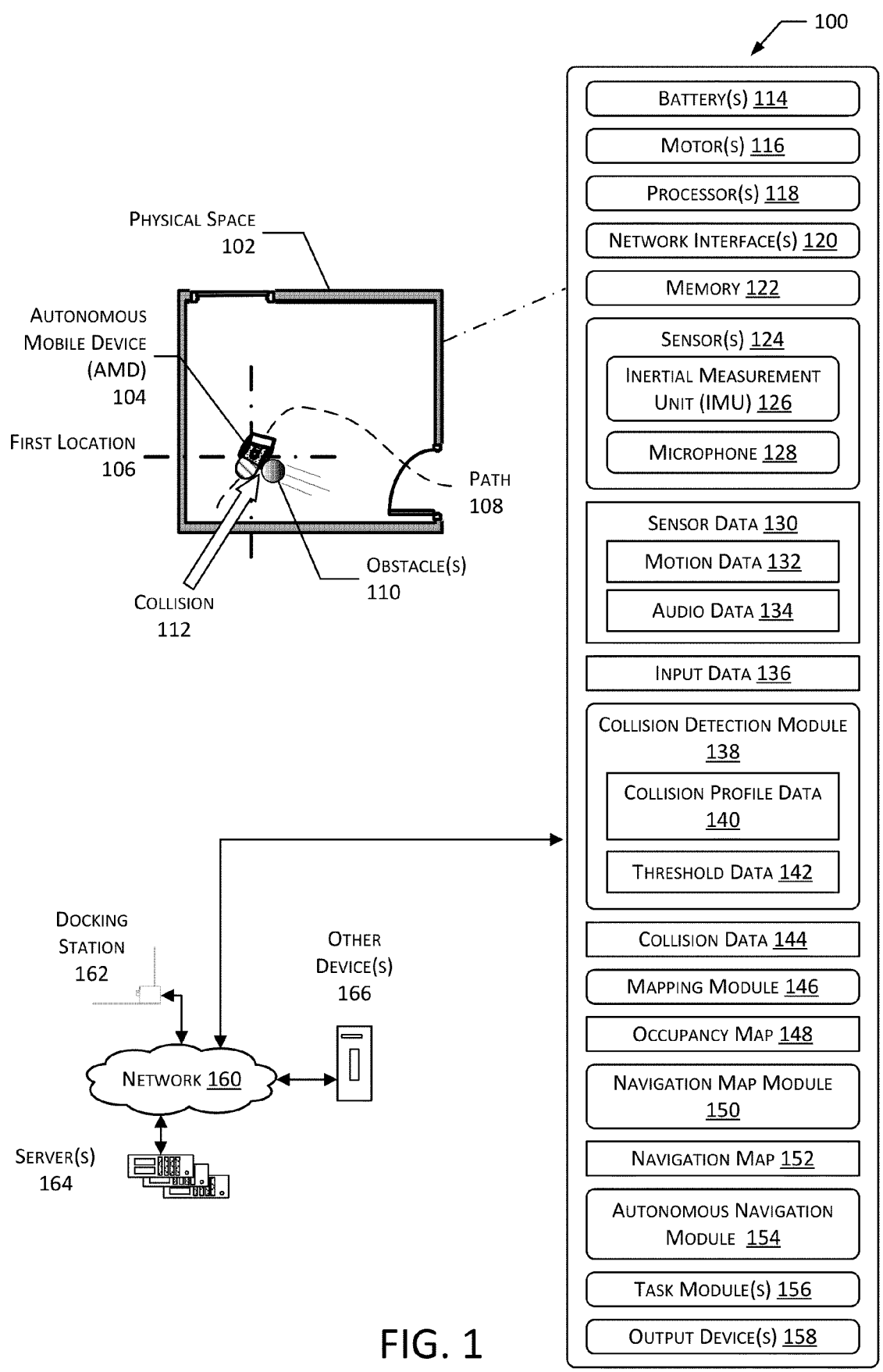
FIG. 1 illustrates a system for an autonomous mobile device (AMD) to detect a collision, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may include patrolling the physical space, interacting with users, and so forth. For example, the AMD may perform sentry tasks involving moving through rooms in the physical space.

While moving the AMD may experience an inadvertent collision with an obstacle. For example, a moving object may collide with the AMD or the AMD may collide with the object. The ability to accurately detect a collision is important during operation of the AMD. For example, the AMD may be configured to stop moving when a collision is detected. However, false detections may result in impaired operation. Continuing the example, if the AMD stops when a collision is detected, improper determinations of collisions when none have actually occurred may stop or slow down the AMD from completing a task.

Traditional collision detection systems are costly to implement and unreliable. For example, bumper switches around a perimeter of a robot may detect a collision by the switch closing due to the mechanical force of the collision. However, bumper switches add cost, complexity, and do not detect collisions with parts of the robot which do not have bumper switches.

Described in this disclosure are systems and techniques for using sensors on an AMD to determine a collision. The sensors on the AMD may include an inertial measurement unit (IMU) and a microphone. The IMU may include one or more accelerometers or gyroscopes and provides information about accelerations imposed on the AMD. The microphone may comprise a single microphone or an array, that provides information about the ambient environment as well as sounds transferred through the structure of the AMD.

A collision detection module uses sensor data from the sensors to determine collision data. A collision having sufficient force produces a change in motion of the AMD. For example, the collision may cause the AMD to move forward, backwards, sideways, rotate, and so forth. The collision with sufficient force may also produce a sound that is detectable by the microphone. For example, a moving soccer ball that collides with the AMD may cause the AMD to move sideways and also creates a sound.

The collision detection module may use motion data to determine a shock event that comprises an abrupt acceleration that is not initiated by the AMD. For example, the shock event may comprise an acceleration, along a horizontal axis of the AMD, that exceeds a threshold. Vertical accelerations may be disregarded to avoid false positives due to differences in the surface the AMD is traversing. Changes in the velocity of the AMD before and after the shock event may be compared. If the velocity after the shock event is less than the velocity before the shock event, a collision may be determined to have occurred.

The collision detection module may also determine motion profile data, indicative of acceleration at different times associated with the shock event. The motion profile data associated with the time of the shock event may be compared to previously stored data. If the comparison exceeds a threshold, the motion data may be deemed to be indicative of a collision.

The collision detection module may combine the information from the motion data with information from the audio data. The audio data that corresponds to the time of the shock event may be analyzed to determine if an acoustic event indicative of a collision is detected.

In one implementation the audio data may be processed with a band pass filter that passes a range of sounds associated with a natural frequency of the structure of the AMD. The force of a collision may induce a vibration in the structure of the AMD at the natural frequency, which is detected by the microphone. If the amplitude of a signal within the range of sounds passed by the band pass filter exceeds a threshold, then the audio data may be deemed to be indicative of an acoustic event consistent with a collision.

In another implementation, the audio data may be compared to previously stored data that is associated with collisions. For example, the audio data may be processed to determine audio spectrum data that characterizes the sound acquired by the microphone. The audio spectrum data associated with the time of the shock event may be compared to the previously stored data. If the comparison exceeds a threshold, the audio data may be deemed to be indicative of a collision.

The collision detection module may use one or more of the audio spectrum data or the motion profile data to determine a collision type. For example, the collision type may indicate soft object, medium object, hard object, fixed object, moveable object, and so forth. Continuing the example, a collision with a soft-sided footstool that moves during the collision may result in a lower maximum acceleration than a collision with a hard fixed object such as a wall which would abruptly stop the AMD. Likewise, the sound of the collision with the footstool would differ from the collision with the wall. In some situations, the collision type may determine the response of the AMD. For example, a collision with a soft object may result in the AMD stopping and reversing slowly. In another example, a collision with a hard object may result in the AMD stopping and presenting an attention signal to request human assistance.

The collision detection module may use information about the location of the AMD in the physical space or other sensor data to determine one or more thresholds for detecting collisions. Different portions of the physical space may have different characteristics that affect the AMD when unimpeded and in the event of a collision. For example, a living room may have a deep pile carpet while an entryway may have a bumpy hard floor tile and a hallway has a smooth wood floor. Each of these different surfaces may affect how the AMD interacts during unimpeded operation or during a collision. For example, while moving along the smooth wood floor the AMD may experience minimal accelerations along a left-right axis and a front-back axis, compared to moving along the bumpy hard floor. As a result, thresholds used to detect collisions may vary based on the characteristics of the physical space in which the AMD is located.

The different characteristics of the physical space may also affect the interaction between an obstacle and the AMD during a collision. For example, due to differences in the friction between the AMD and the floor surface, while on the smooth wood floor a side collision from soccer ball may move the AMD farther than the same collision on the deep pile carpet. As a result, the characteristics of the collision may differ depending on the characteristics of the physical space.

In some implementations, information about a current location of the AMD may be used to set one or more thresholds of the collision detection module. Continuing the example above, if the AMD determines it is in the living room on the carpet, the collision detection module may have a lower threshold for detection of a shock event than when the AMD is determined to be in the entryway with the bump hard floor.

By using the techniques and systems described in this disclosure, the AMD is able to quickly and accurately determine occurrence of a collision. The sensors used may include those already installed in the AMD for other purposes, and thus do not require additional hardware. This reduces the complexity and overall cost of the device. Collision detection is swift, with detection possible in less than one second, allowing the AMD to quickly react. This quick reaction time improves the safety of the AMD.

Unlike other systems, the collision detection module may also provide data that characterizes the type of the collision. By characterizing the type of collision, the AMD may respond more intelligently, improving the usability of the AMD while also providing safe operation. For example, a stuffed toy that is thrown at the side of the AMD while it is in motion may result in soft object collision type. Responsive to this, the AMD may stop, wait, and then if no further collisions are detected for some period of time, may slowly resume moving. In comparison, a collision with a hard object may result in the AMD stopping and asking for human assistance. As a result, overall safety of the system is improved.

Illustrative System

FIG. 1 illustrates a system 100 for detecting a collision in a physical space 102 with an autonomous mobile device (AMD) 104, according to some implementations. The physical space 102 comprises several rooms. The AMD 104 is present at a first location 106 and is moving along a path 108 to a second location in another room. One or more obstacles 110 may be present within the physical space 102. For example, obstacles 110 may comprise walls, furnishings, stairwells, people, pets, toys, and so forth. While moving from one location to another, the AMD 104 needs to determine where it is at a given time, determine the location of obstacles 110, and move while avoiding collisions with any of these obstacles 110. The command to move may be the result of an input from the user, a previously scheduled task, responsive to input from one or more sensors, a command from an external computing device, or another source.

The obstacles 110 may be fixed, such as walls or large furniture, or moveable such as toys or small pieces of furniture, and so forth. Obstacles 110 may be hard, such as walls or doors, or soft such as a stuffed toy.

In this illustration, while the AMD 104 is moving along the path 108 from the first location 106 in the physical space 102, an obstacle 110 comprising a ball collides with the AMD 104, resulting in a collision 112. The detection of the collision 112 and subsequent reaction of the AMD 104 are described below.

The AMD 104 may include a battery(s) 114 to provide electrical power for operation of the AMD 104. The battery 114 may be rechargeable, allowing it to store electrical energy obtained from an external source. In other implementations a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth.

During use, a user may issue a command. For example, the user may provide speech input by uttering the command "robot, come here". In another example, the user may indicate the command using a computing device, such as a smartphone or tablet computer. Data indicative of the command may then be provided to the AMD 104.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM).

The AMD 104 may include one or more sensors 124. For example, the sensors 124 may include one or more inertial measurement units (IMUs) 126, one or more microphones 128, time-of-flight (TOF) sensors, cameras, LIDAR, and so forth. The sensors 124 may generate sensor data 130. For example, the IMU 126 may provide motion data 132. The motion data 132 may comprise data indicative of one or more of linear or rotational accelerations with respect to one or more axes. In some implementations the motion data 132 may comprise derived or integrated values from these accelerations. For example, the motion data 132 may comprise a linear velocity. The microphone 128 may provide audio data 134. For example, the audio data 134 may comprise a digital representation of an analog signal acquired by the microphone 128. The sensors 124 are discussed in more detail with regard to FIG. 3.

During operation the AMD 104 may determine input data 136. The input data 136 may include or be based at least in part on sensor data 130 from the sensors 124 onboard the AMD 104. In one implementation, a speech processing module may process raw audio data obtained by the microphone 128 on the AMD 104 and produce input data 136. For example, the user may say "robot, come here" which may produce input data 136 "come here".

A collision detection module 138 uses one or more of the motion data 132, the audio data 134, or other sensor data 130 during operation. For example, the sensor data 130 may be analyzed and compared with collision profile data 140 and threshold data 142 to determine collision data 144. The collision profile data 140 may comprise information indicative of motion data 132, audio data 134, and so forth associated with a collision 112. For example, the collision profile data 140 may indicate particular motion profile data that is indicative of accelerations of the AMD 104 associated with a collision 112, and the corresponding audio spectrum data indicative of the sound of that collision 112. In some implementations, the collision profile data 140 may provide data that is associated with particular types of collisions 112. The threshold data 142 may be indicative of thresholds, such as an acceleration threshold associated with a shock event, length of an interval of time after a shock event to assess velocity of the AMD 104, and so forth.

In one implementation, the collision detection module 138 may determine at a first time, based on the motion data 132, a shock event indicative of an acceleration that exceeds an acceleration threshold. The motion data 132 and the audio data 134 may be analyzed to determine if a collision 112 has taken place. For example, if the motion data 132 indicates a change in velocity of the AMD 104 from before the first time relative to after, and the audio data 134 indicates the sound of a collision 112, collision data 144 indicative of a collision 112 may be determined.

Operation of the collision detection module 138 is discussed in more detail below.

In another implementation, the collision detection module 138 may compare at least the motion data 132 with information about the path 108 that the AMD 104 is expected to move along. If the motion data 132 varies beyond a threshold amount from the path 108, and the audio data 134 corresponds to a collision 112, then collision data 144 indicative of a collision 112 may be determined.

A mapping module 146 determines an occupancy map 148 that is representative of the physical features in the physical space 102. For example, the sensors 124 may comprise one or more cameras that obtain sensor data 130 comprising image data of the physical space 102. Continuing the example, TOF sensors may provide information about distance to obstacles 110. The sensor data 130 may be processed to determine the presence of obstacles 110.

The occupancy map 148 may comprise data that indicates the location of one or more obstacles 110, such as a table, wall, stairwell, and so forth. In some implementations, the occupancy map 148 may comprise a plurality of cells with each cell of the plurality of cells representing a particular area in the physical space 102. Data, such as an obstacle value, may be stored that indicates whether a cell associated with an area in the physical space 102 is occupied by an obstacle 110, is unoccupied, or is unobserved. An obstacle 110 may comprise an object or feature that prevents or impairs traversal by the AMD 104. For example, an obstacle 110 may comprise a wall, stairwell, and so forth.

The occupancy map 148 may be manually or automatically determined. For example, during a learning phase the user may take the AMD 104 on a tour of the physical space 102, allowing the AMD 104 to explore and generate the occupancy map 148 and associated data, such as tags designating a particular obstacle type, such as "furniture" or "fragile". In another example, during subsequent operation, the AMD 104 may generate the occupancy map 148 that is indicative of locations and types of obstacles 110 such as chairs, doors, stairwells, and so forth as it moves unattended through the physical space 102. The occupancy map 148 may include information such as tags or labels that designate particular rooms or portions of the physical space 102, and so forth.

In some implementations, information associated with the physical space 102 may be stored as a multi-layered data structure. For example, a first layer may comprise the information associated with the occupancy map 148, providing information about obstacle values associated with particular areas in the physical space 102. A second layer may comprise tags. A third layer may comprise data indicative of collisions 112, and so forth. For example, the collision data 144 may be associated with a particular location in the physical space 102 that corresponds to where the AMD 104 was at the time of the collision 112. Data indicative of the location of the collision 112 may be stored and used for later path planning. Continuing the example, areas in the physical space 102 that are associated with the occurrence of collisions 112 may be avoided if alternative paths exist.

Modules described herein, such as the collision detection module 138, the mapping module 146, and so forth may provide various processing functions such as de-noising, filtering, and so forth. Processing of sensor data 130, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 130. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, finite state machines, and so forth, may also be used to process the sensor data 130 or other data. For example, the ANN may be trained using a supervised learning algorithm such that object identifiers are associated with images of particular objects within training images provided to the ANN. Once trained, the ANN may be provided with the sensor data 130 and produce output indicative of the object identifier. In another example, an ANN may be trained to recognize a collision 112 based on particular motion data 132 and audio data 134.

A navigation map module 150 may determine the navigation map 152 by inflating or enlarging the apparent size of obstacles 110 as indicated by the occupancy map 148 using one or more inflation parameters. For example, an inflation parameter may indicate an inflation distance of 10 cm, in which case cells within 10 cm of a cell designated as occupied in an inflated occupancy map would be designated as being occupied as well. The inflation operation enlarges the apparent size of the obstacles 110 as they are represented in the navigation map 152. This inflation provides a buffer of clear space around known obstacles 110 as indicated in the occupancy map 148. This buffer of clear space facilitates path planning in situations where the AMD 104 is considered a point object and also facilitates movement of the AMD 104 by allowing for sensor noise, variations in localization of the AMD 104 at any given time, and so forth.

An autonomous navigation module 154 provides the AMD 104 with the ability to navigate within the physical space 102 without real-time human interaction. The autonomous navigation module 154 may implement, or operate in conjunction with, the mapping module 146 to determine one or more of the occupancy map 148, the navigation map 152, or other representations of the physical space 102. The autonomous navigation module 154 is discussed in more detail with regard to FIG. 2.

The AMD 104 autonomous navigation module 154 may generate path plan data that is indicative of the path 108 through the physical space 102 from the first location 106 to the second location. The AMD 104 may then begin moving along the path 108.

While moving along the path 108, the AMD 104 may assess the physical space 102 and update or change the path 108 as appropriate. For example, if an obstacle 110 such as a closed door appears in the path 108, the mapping module 146 may determine the presence of the obstacle 110. The navigation map 152 may then be used by the autonomous navigation module 154 to plan an alternative path to the destination location. In another example, if the collision detection module 138 determines collision data 144 indicative of a collision 112, the AMD 104 may stop and the autonomous navigation module 154 may determine an alternative path to the destination location.

The AMD 104 may utilize one or more task modules 156. The task module 156 comprises instructions that, when executed, provide one or more functions. The task modules 156 may perform functions such as finding a user, following a user, present output on output devices 158 of the AMD 104, perform sentry tasks by moving the AMD 104 through the physical space 102 to determine the presence of unauthorized people, and so forth.

The AMD 104 includes one or more output devices 158, such as one or more of a motor 116, light, speaker, display, projector, printer, and so forth. The one or more output devices 158 may be used to provide output during operation of the AMD 104. The output devices 158 are discussed in more detail with regard to FIG. 3.

The AMD 104 may use the network interfaces 120 to connect to a network 160. For example, the network 160 may comprise a wireless local area network, that in turn is connected to a wide area network such as the Internet.

The AMD 104 may be configured to dock or connect to a docking station 162. The docking station 162 may also be connected to the network 160. For example, the docking station 162 may be configured to connect to the wireless local area network 160 such that the docking station 162 and the AMD 104 may communicate. The docking station 162 may provide external power which the AMD 104 may use to charge the battery 114.

The AMD 104 may access one or more servers 164 via the network 160. For example, the AMD 104 may utilize a wakeword detection module to determine if the user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 164 for further processing. The servers 164 may process the spoken audio and return to the AMD 104 data that may be subsequently used to operate the AMD 104.

The AMD 104 may also communicate with other devices 166. The other devices 166 may include one or more devices that are within the physical space 102, such as a home or associated with operation of one or more devices in the home. For example, the other devices 166 may include a doorbell camera, a garage door opener, a refrigerator, washing machine, and so forth. In some implementations the other devices 166 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
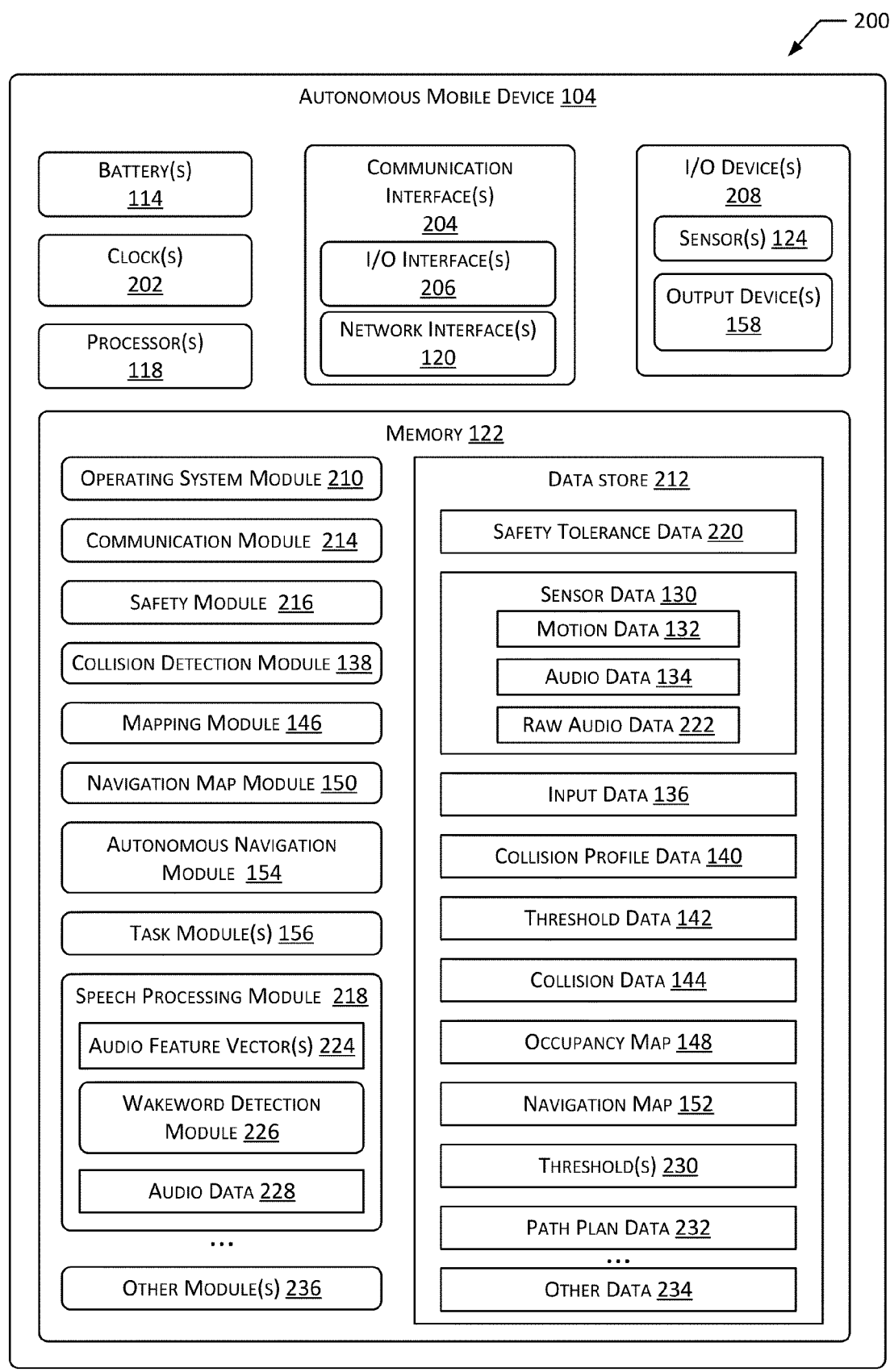
FIG. 2 is a block diagram of the components of the AMD, according to some implementations.

FIG. 2 is a block diagram 200 of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 130, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 166 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, pointing device, scanner, and so forth. The I/O devices 208 may also include output devices 158 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 166 such as other AMDs 104, docking stations 162, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the AMD Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 166 including other AMDs 104, servers 164, network attached storage devices, and so forth.

A communication module 214 may be configured to establish communication with other devices 166, such as other AMDs 104, an external server 164, a docking station 162, and so forth. The communications may be authenticated, encrypted, and so forth.

Other modules within the memory 122 may include a safety module 216, the collision detection module 138, the mapping module 146, the navigation map module 150, the autonomous navigation module 154, the one or more task modules 156, a speech processing module 218, or other modules 236. The modules may access data stored within the data store 212, including safety tolerance data 220, sensor data 130, thresholds 230, path plan data 232, other data 234, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. In another example, the safety module 216 may stop the movement of the AMD 104 if the collision data 144 is indicative of a collision 112. Movement of the AMD 104 may be stopped by one or more of inhibiting operations of one or more of the motors 116, issuing a command to stop motor operation, disconnecting power from one or more the motors 116, and so forth. The safety module 216 may be implemented as hardware, software, or a combination thereof.

The safety module 216 may control other factors, such as a maximum velocity of the AMD 104 based on information obtained by the sensors 124, precision and accuracy of the sensor data 130, and so forth. For example, detection of an object by an optical sensor may include some error, such as when the distance to an object comprises a weighted average between an object and a background. As a result, the maximum velocity permitted by the safety module 216 may be based on one or more factors such as the weight of the AMD 104, nature of the floor, distance to the object, and so forth. In the event that the maximum permissible velocity differs from the maximum velocity permitted by the safety module 216, the lesser velocity may be utilized.

The mapping module 146 may use one or more of sensor data 130, input data 136, and so forth to determine the occupancy map 148 that is representative of the physical features in the physical space 102. In one implementation, during a learning phase the user may take the AMD 104 on a tour of the physical space 102, allowing the AMD 104 to explore and generate the occupancy map 148 and associated data. In another example, during subsequent operation, the AMD 104 may generate the occupancy map 148 as it moves unattended through the physical space 102.

The navigation map module 150 may use the occupancy map 148 to generate the navigation map 152. One or more inflation parameters may be used during operation of the navigation map module 150. The inflation parameters provide information such as inflation distance, inflation adjustment values, and so forth. In some implementations the inflation parameters may be based at least in part on the sensor field of view (FOV), physical dimensions of the AMD 104, localization accuracy, and so forth. For example, the navigation map module 150 may inflate the apparent area of an obstacle 110 by an inflation distance that is greater than one half the width of the AMD 104.

The autonomous navigation module 154 provides the AMD 104 with the ability to navigate within the physical space 102 without real-time human interaction. The autonomous navigation module 154 may implement, or operate in conjunction with, the mapping module 146 to determine the occupancy map 148, the navigation map 152, or other representation of the physical space 102. In one implementation, the mapping module 146 may use one or more simultaneous localization and mapping ("SLAM") techniques. The SLAM algorithms may utilize one or more of maps, algorithms, beacons, or other techniques to navigate. The autonomous navigation module 154 may use the navigation map 152 to determine a set of possible paths 108 along which the AMD 104 may move. One of these may be selected and used to determine path plan data 232 indicative of a path 108. For example, a possible path 108 that is the shortest, or has the fewest turns, traverses the fewest doors, and so forth may be selected and used to determine the path 108. In one implementation, the Theta* path planning algorithm may be used to determine a path cost for each path 108, and the path cost may be used to select a particular path 108. (See "Theta*: Any-Angle Path Planning on Grids", Alex Nash, Kenny Daniel, Sven Koenig, Ariel Felner.)

The path 108 is then subsequently used to determine a set of commands that drive the motors 116 connected to the wheels. For example, the autonomous navigation module 154 may determine the first location 106 within the physical space 102 and determine path plan data 232 that describes the path 108 to a second location.

The autonomous navigation module 154 may utilize various techniques during processing of sensor data 130. For example, image data obtained from cameras on the AMD 104 may be processed to determine one or more of corners, edges, planes, and so forth. In some implementations, corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 130, and so forth. For example, an external server 164 may send a command that is received using the network interface 120. This command may direct the AMD 104 to proceed to find a particular user, follow a particular user, and so forth. The AMD 104 may then process this command and use the autonomous navigation module 154 to determine the directions and distances associated with carrying out the command. For example, the command to "come here" may result in a task module 156 sending a command to the autonomous navigation module 154 to move the AMD 104 to a particular location near the user and orient the AMD 104 in a particular direction.

The speech processing module 218 may be used to process utterances of the user. Microphones 128 may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone 128, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 160 in the form of output audio data. To avoid the output audio interfering with the device's ability to detect and process input audio, the AFE or other component may use an echo cancellation algorithm to perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN / recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 164 for speech processing. The audio data 228 corresponding to audio obtained by the microphone 128 may be processed locally on one or more of the processors 118, sent to a server 164 for routing to a recipient device or may be sent to the server 164 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 150, prior to sending to the server 164, and so forth.

The speech processing module 218 may include or access an automated speech recognition (ASR) module. The ASR module may accept as input raw audio data 222, audio feature vectors 224, or other sensor data 130 and so forth and may produce as output the input data 136 comprising a text string or other data representation. The input data 136 comprising the text string or other data representation may be processed by the navigation map module 150 to determine the command to be executed. For example, the utterance of the command "robot, come here" may result in input data 136 comprising the text string "come here". The wakeword "robot" may be omitted from the input data 136.

The AMD 104 may connect to the network 160 using one or more of the network interfaces 120. In some implementations, one or more of the modules or other functions described here may execute on the processors 118 of the AMD 104, on the server 164, or a combination thereof. For example, one or more servers 164 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store other data 234 as well. For example, localization settings may indicate local preferences such as language, user identifier data may be stored that allows for identification of a particular user, and so forth.

Figure 3:
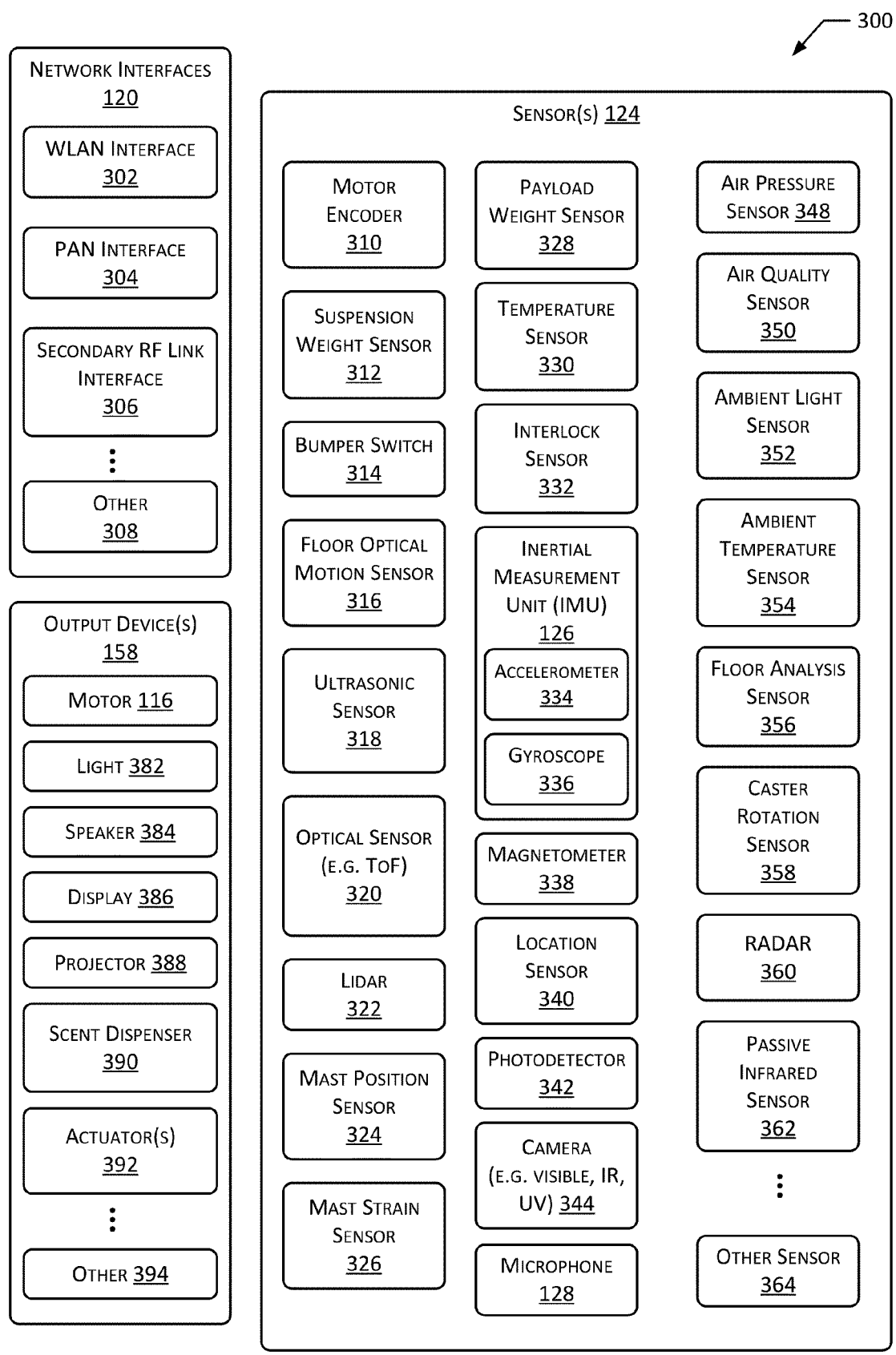
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 158, according to some implementations. The components illustrated here are provided by way of illustration and not necessarily as a limitation. For example, the AMD 104 may utilize a subset of the particular network interfaces 120, output devices 158, or sensors 124 depicted here, or may utilize components not pictured. One or more of the sensors 124, output devices 158, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 166 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 162, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 154 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited.

One or more bumper switches 314 provide an indication of physical contact between a bumper or other member that is in mechanical contact with the bumper switch 314. The safety module 216 utilizes sensor data 130 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 130 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 154 may utilize the sensor data 130 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 130 may be generated that is indicative of the presence of objects and the relative positions, shapes, and so forth that are visible to the lidar 322. Data from the lidar 322 may be used by various modules. For example, the autonomous navigation module 154 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 216 may utilize sensor data 130 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 114, one or more motors 116, and so forth. In the event the temperature exceeds a threshold value, the component associated with that device temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

The sensors 124 may include an inertial measurement unit (IMU) 126. The IMU 126 may include one or more of an accelerometer 334 or a gyroscope 336 (or gyrometer). The accelerometer 334 provides information indicative of a direction and magnitude of an imposed acceleration. Data such as rate of change, determination of changes in direction, velocity, and so forth may be determined using the accelerometer 334. The accelerometer 334 may comprise mechanical, optical, micro-electromechanical, or other devices. For example, the accelerometer 334 may comprise a prepackaged solid-state device that provides multiple axis accelerometers 334.

The gyroscope 336 (or gyrometer) may provide information indicative of rotation of an object affixed thereto. For example, the gyroscope 336 may generate sensor data 130 that is indicative of a change in angular orientation of the AMD 104 or a portion thereof with respect to an axis. The gyroscope 336 may comprise mechanical, optical, micro-electromechanical, or other devices. For example, the gyroscope 336 may comprise a prepackaged solid-state device that provides multiple axis gyroscopes 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 130 indicative of impinging light. For example, the photodetector 342 may provide data indicative of a color, intensity, duration, and so forth.

A camera 344 generates sensor data 130 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 130 comprising images being sent to the autonomous navigation module 154. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 154 may be acquired using a rolling shutter and subsequently may be processed to mitigate image artifacts.

One or more microphones 128 may be configured to acquire information indicative of sound present in the physical space 102. In some implementations, arrays of microphones 128 may be used. These arrays may implement beamforming techniques to provide for directionality of gain. The AMD 104 may use the one or more microphones 128 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 154, the task module 156, and so forth. For example, if the floor analysis sensor 356 determines that the floor is wet, the safety module 216 may decrease the velocity of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear velocity of the caster, and so forth. For example, the caster rotation sensor 358 may comprise an optical encoder and corresponding target that is able to determine that the caster transitioned from an angle of 0° at a first time to 49° at a second time. Data from the caster rotation sensor 358 may be used to determine at least a portion of the motion data 132.

The sensors 124 may include a radar 360. The radar 360 may be used to provide information as to a distance, lateral position, and so forth, to an object.

The sensors 124 may include a passive infrared (PIR) sensor 362. The PIR 362 sensor may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 154. One or more touch sensors may be utilized to determine contact with a user or other objects.

The AMD 104 may include one or more output devices 158. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 116 with an eccentric weight may be used to create a buzz or vibration to allow the AMD 104 to simulate the purr of a cat.

Figure 4A:
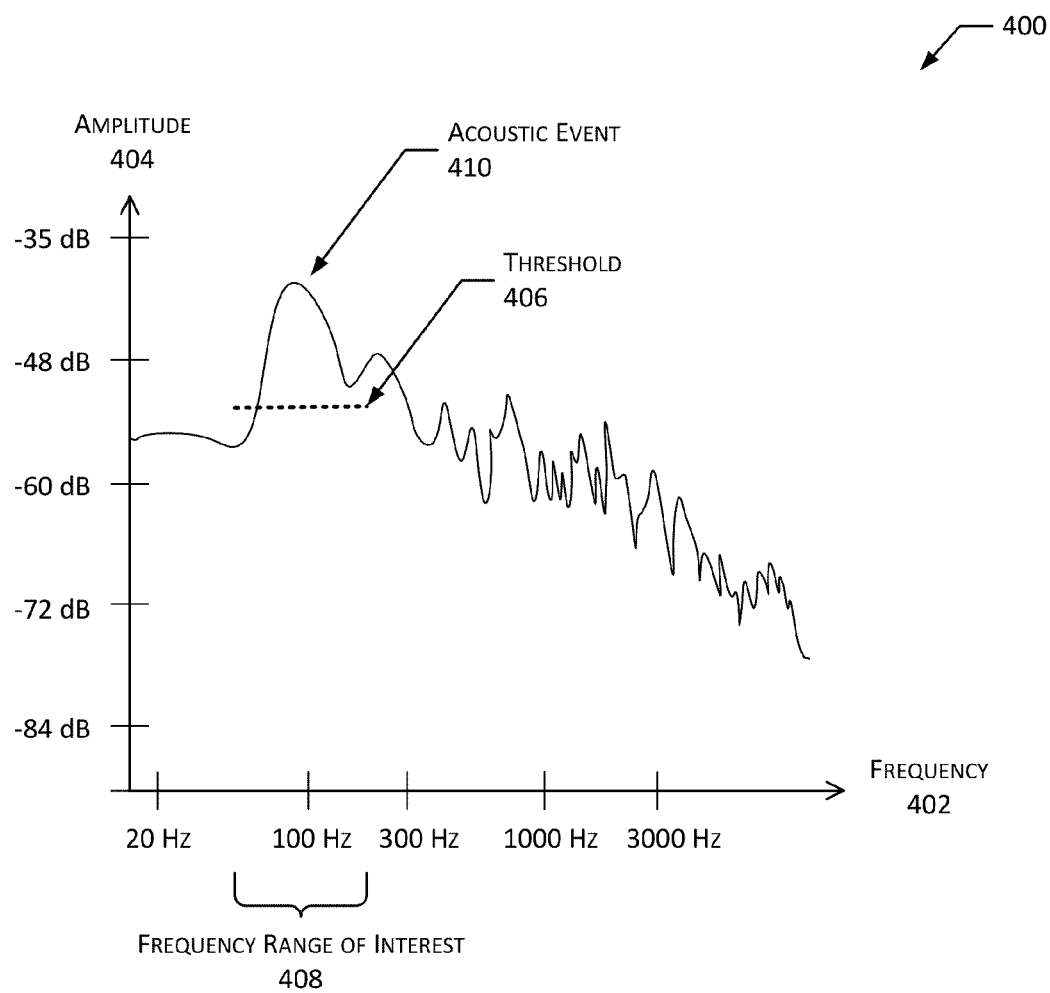
FIGS. 4A and 4B illustrate audio spectrum data associated with a collision, according to some implementations.

FIG. 4A illustrates a graph 400 of audio spectrum data of an acoustic event associated with a collision 112, according to some implementations. The audio data 134 may be processed to determine one or more characteristics. These characteristics may include, but are not limited to, frequency, amplitude, phase, duration, and so forth.

The graph 400 depicts audio spectrum data representing a frequency spectrum of a signal represented by the audio data 134 for a specified interval of time. Frequency 402 is depicted on a horizontal axis while amplitude 404 is depicted on a vertical axis. A threshold 406 is also depicted. The threshold 406 may be fixed or variable. For example, the threshold 406 may vary based on velocity of the AMD 104. Continuing the example, as the velocity of the AMD 104 increases, the threshold 406 may increase as well.

In some implementations the threshold 406 may be determined based at least in part on the location of the AMD 104. For example, as the AMD 104 moves across a rough floor the sound detected by the microphone may be greater in amplitude than the sound detected while moving across a smooth floor. Continuing the example, the threshold 406 for determining an acoustic event may be greater on the rough floor than on the smooth floor.

A frequency range of interest 408 is also shown. This may comprise a range of frequencies that are associated with a collision 112. For example, the frequency range of interest 408 may include a natural frequency that at least a portion of the structure of the AMD 104 will oscillate. A force input, such as from a collision 112, may cause the at least a portion of the structure of the AMD 104 to oscillate, with the oscillation exhibiting an amplitude at the natural frequency within the frequency range of interest 408 that exceeds the threshold 406 due to resonance. The frequency range of interest 408 may vary based on various factors, including but not limited to the stiffness of the structure. This oscillation may result in a peak in the signal represented by the audio data 134 within the frequency range of interest 408 that includes the natural frequency. In this illustration, an acoustic event 410 is depicted, represented by a peak in the amplitude 404 of the signal at about 100 Hz, which is within the frequency range of interest 408 of the AMD 104 in this example, that exceeds the threshold 406.

Figure 4B:
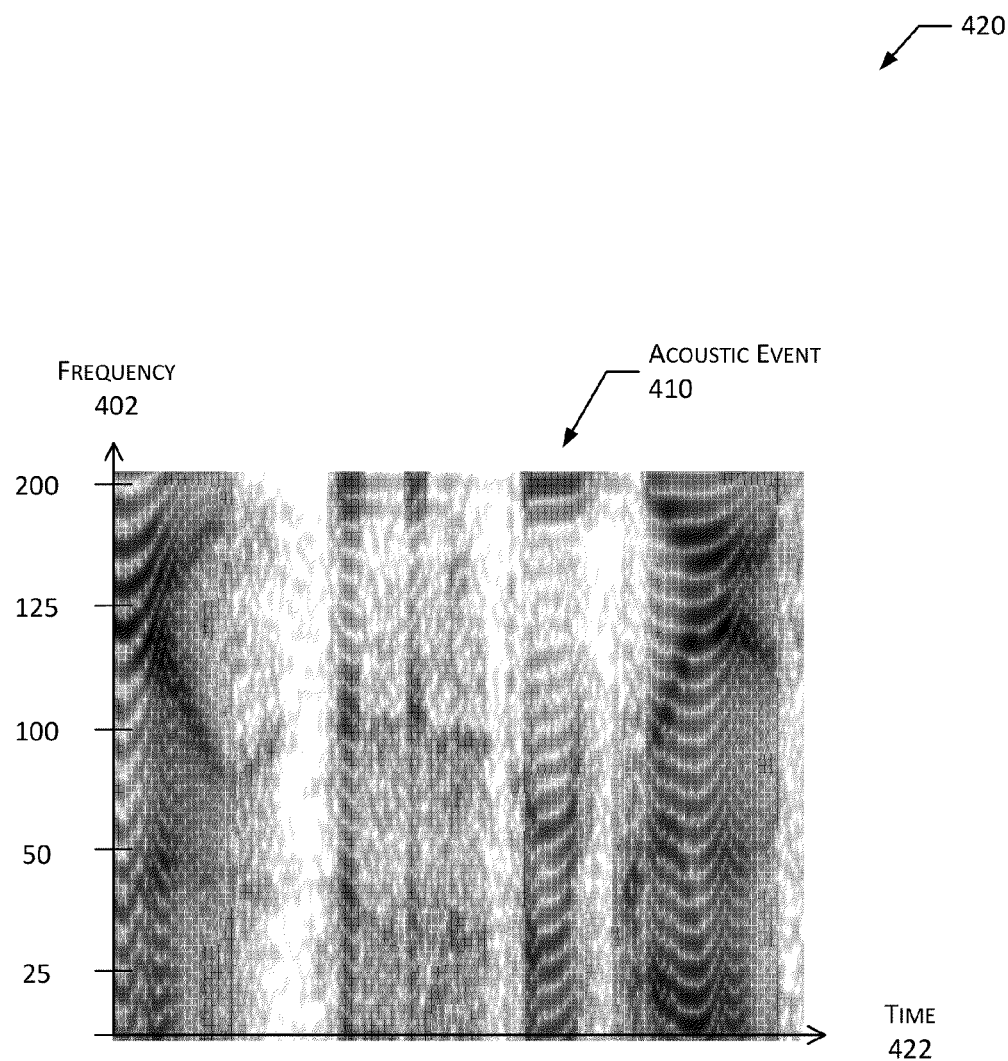

FIG. 4B illustrates a graph 420 of audio spectrum data of the acoustic event associated with a collision 112, according to some implementations. In this graph, a spectrogram of a portion of the audio data 134 is shown. The dimensions of the spectrogram are time 422, frequency 402, and amplitude as indicated by color. For example, black may indicate zero amplitude and white may indicate a maximum amplitude. The acoustic event 410 in this illustration may comprise a particular pattern or arrangement of the spectrogram.

In other implementations the audio spectrum data may comprise other information. For example, an audio spectral density may be determined and used to determine the acoustic event 410.

FIG. 5 illustrates collision profile data 140 and threshold data 142 that may be used to determine, and in some implementations characterize, a collision 112 according to some implementations. The collision profile data 140 may comprise a collision type 502 that is indicative of a type of collision 112. For example, the collision type 502 may indicate soft object, medium object, hard object, fixed object, moveable object, and so forth. The collection type 502 may be associated with one or more of motion profile data 504 or audio spectrum data 506. The motion profile data 504 may comprise information indicative of movement of the AMD 104. In other implementations the motion profile data 504 may comprise one or more vectors or values that are representative of one or more characteristics of the motion.

The motion profile data 504 may be determined from the motion data 132. For example, the motion profile data 504 may comprise acceleration with respect to one or more axes over time, change in velocity over time, change in angular rate over time, and so forth. In some implementations the collision detection module 138 may omit from consideration motion data 132 associated with a vertical axis, with respect to gravity. For example, the collision detection module 138 may utilize one or more of acceleration or velocity data along an X axis (front to back of the AMD 104) or a Y axis (left to right of the AMD 104), while disregarding movement along a Z axis (up and down).

Vertical motion along the Z axis may be disregarded as acceleration changes in the Z axis may be predominately due to the surface along which the AMD 104 is travelling, such as bumps in the surface. By omitting from consideration the vertical motion, the collision detection module 138 may reduce the incidence of false detections of collisions 112.

The collision profile data 140 may comprise audio spectrum data 506. For example, the audio spectrum data 506 may comprise information such as one or more of a frequency spectrum as depicted in FIG. 4A or the spectrogram as depicted in FIG. 4B. In other implementations other types of data associated with the audio data 134 may be stored. For example, spectral density data indicative of a power spectrum of the signal may be stored. In other implementations the audio spectrum data 506 may comprise one or more vectors or values that are representative of one or more characteristics of the signal. The audio spectrum data 506 may be associated with a particular collision type 502.

In some implementations the collision profile data 140 may be generated using an artificial neural network. For example, a convolutional neural network may be configured to determine one or more vectors or values that provide a signature associated with collisions 112, or particular collision types 502. For example, sensor data 130 obtained from an AMD 104 may be used to train a neural network to determine a signature in the sensor data 130 that is associated with a collision 112.

The collision detection module 138 may also utilize threshold data 142. The threshold data 142 may be used to adjust one or more thresholds used by the collision detection module 138 to adjust operation in different conditions. Such adjustment may improve the performance and accuracy of the collision detection module 138.

The threshold data 142 may include one or more of map region 508, floor type 510, acceleration threshold 512, angular rate threshold 514, audio threshold 516, and so forth. The map region 508 may indicate a portion of the physical space 102. For example, the map region 508 may indicate a first area in the physical space 102 associated with the tag "living room", a second area associated with the tag "entryway" and so forth. In some implementations, a map region 508 may be associated with one or more floor types 510.

The floor type 510 may comprise data indicative of the characteristics of the floor. These characteristics may include composition of the floor, topography of the floor, physical characteristics, and so forth. For example, the floor type 510 may indicate "deep pile carpet", "textured tile", "smooth wood", and so forth. The characteristics of different surfaces may affect how the AMD 104 interacts during unimpeded operation or during a collision 112. For example, given collisions 112 of equal momentum, the AMD 104 may exhibit greater acceleration as a result of the collision 112 on the "smooth wood" flooring than on the "deep pile carpet" due to the difference in friction between the AMD 104 and the surface. As a result, thresholds used to determine collisions 112 may vary based on the floor type 510.

Depending on the object involved in the collision 112 and where, with respect to the AMD 104, the collision 112 takes place, the collision 112 may result in the AMD 104 translating or rotating. The translation may comprise a horizontal movement along one or more of the X or Y axes, while the rotation may comprise a rotation with respect to one or more of the X, Y, or Z axes.

The acceleration threshold 512 may specify an acceleration threshold that is associated with a shock event. For example, the acceleration threshold 512 may indicate a minimum acceleration that is deemed to be indicative of a shock event. As described above, due to interactions between the floor and the AMD 104, different acceleration thresholds 512 may be associated with different floor types 510. Likewise, an angular rate threshold 514 may indicate a minimum angular rate of rotation that is deemed to be indicative of a shock event.

An audio threshold 516 may specify the threshold 406 to be exceeded for a determination of an acoustic event 410. Different surfaces may produce different sounds with different amplitudes as determined by the microphone in the AMD 104. The audio threshold 516 may be determined based on the location of the AMD 104 to maintain an appropriate threshold that avoids a false determination of a collision 112 due to a noisy floor. For example, the audio threshold 516 for the carpeted floor in the living room may be "30" while the audio threshold 516 for the textured tile may be "217".

Other thresholds may also be specified. For example, a velocity change threshold may be specified that indicates a change in velocity of the AMD 104 from a first time to a second time that is associated with a collision 112. For example, a second velocity of the AMD 104 after a shock event that is 0.65 or less of a first velocity of the AMD 104 before the shock event may be deemed indicative of a collision 112.

In some implementations, the thresholds associated with operation of the collision detection module 138 may be set to relatively high values. For example, during an initial exploration of the physical space 102 or when the threshold data 142 for a particular map region 508 is unavailable, the thresholds may be set to a maximum level to avoid incorrect determinations of collisions 112 due to characteristics of the floor.

Figure 6:
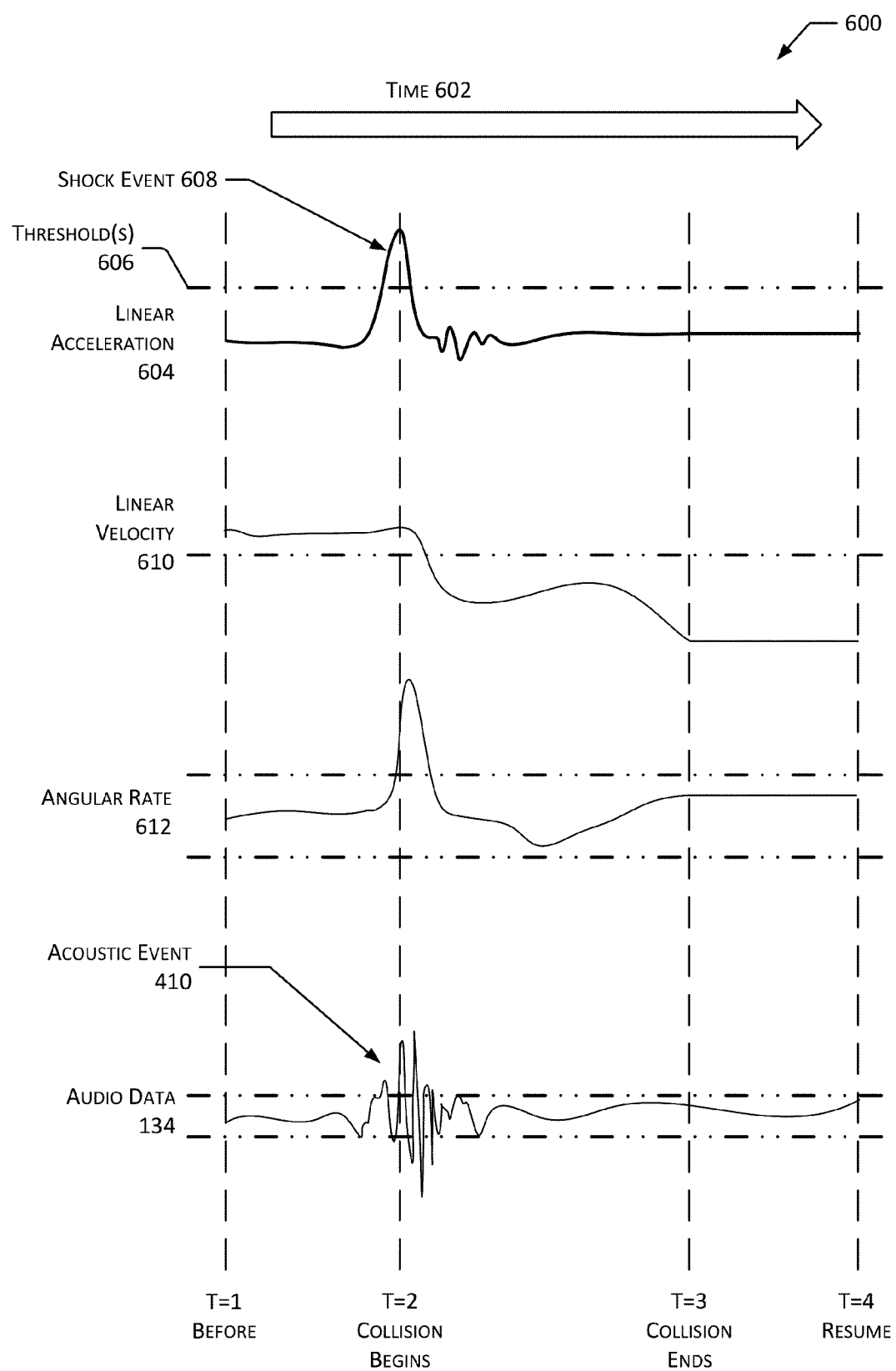
FIG. 6 is graph of a collision and associated data as determined by sensors on the AMD, according to some implementations.

FIG. 6 is graph 600 of a collision 112 and associated data as determined by sensors 124 on the AMD 104, according to some implementations. Time 602 is indicated in this graph along a horizontal axis, with time increasing from left to right.

Linear acceleration 604 of the AMD 104 is depicted. This may comprise the linear acceleration 604 along one or more of the X or Y axes of the AMD 104. As described above, in some implementations vertical motion along the Z axis of the AMD 104 may be disregarded. Thresholds 606 are also shown. A linear acceleration 604 that exceeds a threshold 606 may be deemed indicative of a shock event 608, such as shown at time T=2 where a collision 112 begins.

A linear velocity 610 of the AMD 104 is depicted. For example, the linear velocity 610 may be indicative of the forward velocity of the AMD 104. As shown here, the linear velocity 610 may be affected by the collision 112. For example, the velocity from T=1 before the collision 112 is greater than the velocity after T=2. The linear velocity 610 of the AMD 104 is greater than a linear velocity threshold 606. For example, the collision detection module 138 may be operative when the AMD 104 is travelling at a minimum velocity 610 specified by the linear velocity threshold 606.

An angular rate 612 of the AMD 104 is depicted. For example, the angular rate 612 may comprise an angular rate 612 or acceleration with respect to one or more of the X, Y, or Z axes. In this illustration, the angular rate 612 exceeds a threshold 606 angular rate of rotation at T=2, as the AMD 104 was rotated abruptly due to the collision 112 at that time.

A waveform based on the audio data 134 is also shown. At T=2, the audio data 134 exhibits an amplitude that exceeds a threshold 606. As described above, the audio data 134 may be processed to determine if the audio data 134 corresponds to audio spectrum data 506 that is associated with a collision 112.

In this graph 600, the collision 112 has been deemed to end at T=3. Between T=3 and T=4 the AMD 104 may remain motionless. At T=4 the AMD 104 may take some action, such as resuming movement, presenting output to request human assistance, and so forth.

Figure 7:
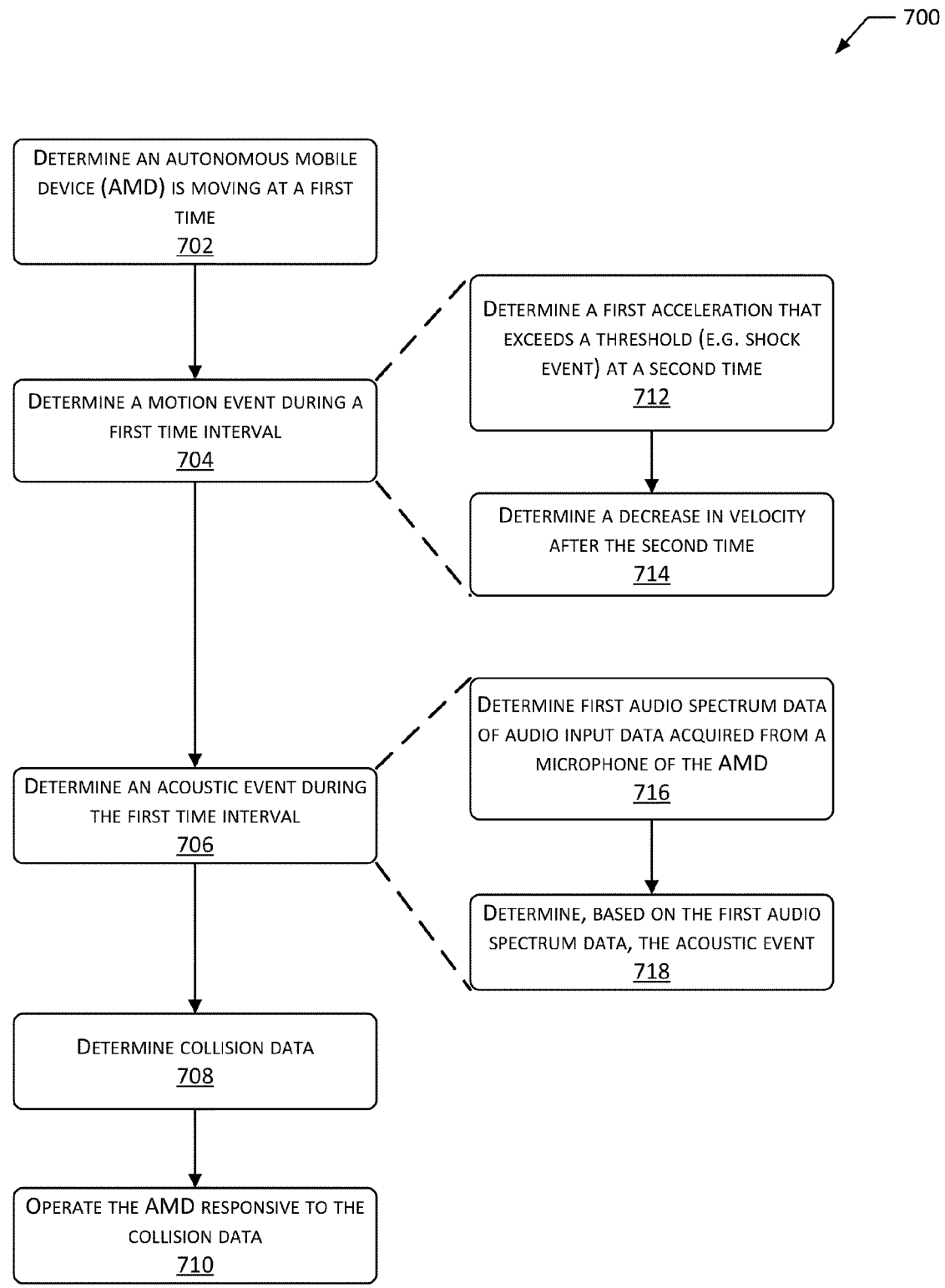
FIG. 7 is a flow diagram of a process for determining a collision, according to some implementations.

FIG. 7 is a flow diagram 700 of a process for determining a collision 112, according to some implementations. The process may be implemented at least in part by the AMD 104.

At 702 the AMD 104 is determined to be moving at a first time. For example, the AMD 104 may be moving greater than or equal to a minimum linear velocity or a minimum angular velocity at time T=1. The linear velocity may be instantaneous or averaged over some period of time.

At 704 a motion event is determined during a first time interval based at least in part on the motion data 132. In one implementation, at 712 a first acceleration is determined at a second time to exceed an acceleration threshold. For example, a shock event 608 may be determined during a time interval between T=1 and T=2 to exceed the acceleration threshold. The acceleration threshold may be determined based at least in part on the velocity of the AMD 104 before time T=1. For example, the acceleration threshold may increase as the linear velocity of the AMD 104 increases. By increasing the acceleration threshold, the system reduces false collision detections that may result from accelerations imposed by the flooring material at higher speeds.

In some implementations angular rate may be assessed to determine if an angular rate exceeds an angular rate threshold. In some implementations, an angular rate threshold may increase as the linear velocity of the AMD 104 increases. By increasing the angular rate threshold, false collision detections may be reduced that may result from rotations imposed by the flooring material at higher speeds.

At 714 a decrease in linear velocity after the second time is determined. For example, the linear velocity 610 before T=1 is greater than the linear velocity 610 after T=2 by a threshold amount. The linear velocity threshold may increase as the linear velocity of the AMD 104 before T=1 increases. By increasing the linear velocity threshold, false collision detections are reduced while travelling at higher speeds.

In one implementation the determination of a collision 112 may be performed as follows. A first linear velocity 610 of the AMD 104 is determined at a first time. A first angular rate 612 of the AMD 104 is also determined at the first time. One or more of: the first linear velocity 610 is determined to exceed a first velocity threshold, or the first angular rate 612 is determined to exceed a first angular rate threshold. At a second time after the first time, a first acceleration is determined to be greater than a first acceleration threshold, wherein the second time is within the first time interval. At a third time that is within the first time interval and after the second time, one or more of: a second linear velocity 610 of the AMD 104 between the second time and the third time is determined to be less than a second velocity threshold, or a second angular rate 612 of the AMD 104 between the second time and the third time is determined to be less than a second angular rate threshold.

The following illustrative code depicts an example of a determination. The determination of the shock event 608, as indicated in the illustrative code as "shock", may be performed as described herein.

```
/* collision detection function */
void CollisionDetection: :processCollisionDetection() {
float average_velocity_before_shock; // m/s
float average_omega_before_shock; // m/s
float max_velocity_before_shock; // m/s, max forward velocity during shock
detection time - time span
float max_velocity_after_shock; // m/s, max forward velocity during shock
detection time + time span
float max_omega_before_shock; // rad/s, max angular velocity during shock
detection time - time span
float max _omega _after shock; // rad/s, max angular velocity during shock
detection time + time span
float min_velocity_after_shock; // m/s, min forward velocity during shock
detection time + time span
float min_omega_after shock; // rad/s, max angular velocity during shock
detection time + time span
is_collision_detected_ = false;
if (is_shock_detected_ == true) {
if (average_velocity_before_shock > velocity _threshold _) {
if (max_velocity_before_shock > max_velocity_after_shock) {
if (min_velocity _after_shock < max_velocity_before_shock * collision_threshold_) {
is_collision_detected_ = true;
}
}
}
if (average_omega_before_shock > omega_threshold_) {
if (max_omega_before_shock > max_omega_after shock) {
if (min_omega_after_shock < max_omega_before_shock * collision_threshold_)
{
is_collision_detected_ = true;
}
}
}
}
}
```

Illustrative Code 1

At 706 an acoustic event 410 is determined during the first time interval. In one implementation, at 716 first audio spectrum data 506 of the audio data 134 is determined. At 718, based on the first audio spectrum data 506, the acoustic event 410 is determined.

In one implementation, the audio data 134 may be filtered with a band pass filter that passes the natural frequency 408. The band pass filter may be used to attenuate other sounds. An amplitude of a signal in the resulting filtered audio data may be compared to the threshold 406. For example, the acoustic event 410 may comprise the amplitude 404 of the signal represented by the first audio spectrum data 506 exceeding the threshold 406, at the natural frequency 408.

In another implementation, the first audio spectrum data 506 from the audio data 134 may be compared to previously stored audio spectrum data 506, such as in the collision profile data 140. For example, a correlation may be formed between a spectrogram of the audio data 134 and a previously stored spectrogram of a known collision 112. If the correlation exceeds a threshold value, the first audio spectrum data 506 may be deemed to be indicative of an acoustic event 410 indicative of a collision 112.

In another implementation, a machine learning system may be used to determine the presence of an acoustic event 410 indicative of a collision 112 in the audio data 134. The machine learning system may comprise a neural network, finite state machine, classifier, and so forth. For example, a neural network may be trained to determine the occurrence of an acoustic event 410.

The audio data 134 may be processed to avoid interference due to audio output of the AMD 104 that is produced by an output device 158, such as a speaker 384 or other transducer. In one implementation, audio output data presented using a transducer, such as a speaker 384, during the first time interval is determined. The audio data 134 is acquired from the microphone 128. An echo cancellation algorithm may be used to process the first audio data, using the audio output data, to produce second audio data. The second audio data may then be processed by the collision detection module 138 as described above. For example, a first characteristic of the second audio data is determined, such as amplitude, frequency, phase, duration, and so forth. Continuing the example, the first characteristic is compared to a threshold.

At 708, collision data 144 is determined. For example, based on the occurrence of the motion event and the acoustic event within the first time interval, data indicative of a collision 112 is determined.

One or more of the thresholds used by the collision detection module 138 may be determined based on the threshold data 142. In one implementation, one or more thresholds may be determined based on the current location of the AMD 104. For example, a current location of the AMD 104 may be determined at a time within the first time interval, such as a T=1, T=2, or T=3. Based on the current location, one or more of the following may be determined: the first acceleration threshold, the second linear velocity threshold, or the second angular rate threshold.

One or more of the thresholds used by the collision detection module 138 may also be determined based on other information, such as motion data 132. For example, the motion data 132 may indicate a first linear velocity 610 or a first angular velocity before the collision 112, such as at T=1. One or more of the thresholds may be determined based at least in part on the first linear velocity 610. For example, the first acceleration threshold may be determined based on the first linear velocity 610. In one implementation, as the first linear velocity 610 increases, the first acceleration threshold may decrease. Other thresholds may also be determined. For example, the second linear velocity threshold may be determined based on the first linear velocity 610. In another example, the second angular rate threshold may be determined based on the first angular velocity.

One or more of the thresholds used by the collision detection module 138 may also be determined based on path plan data 232 or instructions used to operate the motors 116. For example, the collision detection module 138 may take into account accelerations that are expected as a result of operating the motors 116. Continuing the example, if the motors 116 are instructed to accelerate at 1 m/s² at time T=2, the acceleration threshold used to determine the shock event 608 may be increased to avoid a false detection due to the intentional acceleration.

At 710, the AMD 104 is operated responsive to the collision data 144. In one implementation, responsive to the collision data 144, the AMD 104 may come to a stop and cease all motion for at least a threshold amount of time. In another implementation, responsive to the collision data 144, the AMD 104 may update the occupancy map 148. For example, an occupancy value indicative of an obstacle 110 at the location associated with the collision 112 may be determined. The occupancy value may be used to update the occupancy map 148, such that the occupancy map 148 indicates an obstacle 110 at that location. In yet another implementation, the response may be determined at least in part based on the collision type 502 as indicated in the collision data 144. For example, responsive to a collision type 502 of "soft object" the AMD 104 may stop moving for a first interval time, then resume moving slowly for a second interval of time. If no additional collisions 112 are detected, the AMD 104 may resume movement at a greater velocity.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed at least in part by an autonomous mobile device (AMD), the method comprising:
   determining a first location of the AMD at a first time during a first time interval;
   determining, based on the first location, a first acceleration threshold;
   determining, at a second time after the first time and during the first time interval, a first acceleration that is greater than the first acceleration threshold;
   determining, based at least in part on the first acceleration being greater than the first acceleration threshold, a motion event during the first time interval;
   determining, based on first audio data, an acoustic event during the first time interval; and
   determining, based at least in part on the motion event and the acoustic event, collision data indicative of a collision of the AMD with an obstacle.

2. The method of claim 1, the determining the motion event comprising:
   Determining one or more of:
   a first linear velocity of the AMD at the first time, or a first angular rate of rotation of the AMD at the first time;
determining that one or more of:
the first linear velocity exceeds a first velocity threshold, or
the first angular rate exceeds a first angular rate threshold; and
determining, at a third time that is within the first time interval and after the second time, one or more of:
a second linear velocity of the AMD between the second time and the third time is less than a second velocity threshold, or
a second angular rate of the AMD between the second time and the third time is less than a second angular rate threshold.

3. The method of claim 2, further comprising:
determining the first acceleration threshold based on the first linear velocity, wherein the first acceleration threshold increases as the first linear velocity increases;
determining the second velocity threshold is based on the first linear velocity, wherein the second velocity threshold increases as the first linear velocity increases; and
determining the second angular rate threshold based on the first angular rate, wherein the second angular rate threshold increases as the first angular rate increases.

4. The method of claim 2, further comprising:
determining, based on the first location, one or more of:
the second velocity threshold, or
the second angular rate threshold.

5. The method of claim 1, the determining the acoustic event comprising:
processing the first audio data obtained from a microphone on the AMD with a band pass filter to produce filtered audio data; and
determining that one or more values indicative of amplitude in the filtered audio data exceed a first threshold.

6. The method of claim 1, the determining the acoustic event comprising:
determining, based on the first audio data obtained from a microphone on the AMD, a first spectrogram; and
determining a correspondence between the first spectrogram and a second spectrogram that is associated with the collision of the AMD with the obstacle.

7. The method of claim 1, the determining the acoustic event comprising:
determining audio output data associated with audio output from a speaker on the AMD during the first time interval;
acquiring the first audio data using a microphone on the AMD during at least a portion of the first time interval;
processing the first audio data, with an echo cancellation algorithm using the audio output data, to produce second audio data;
determining a first characteristic of the second audio data; and
comparing the first characteristic with a threshold.

8. The method of claim 1, further comprising:
stopping movement of the AMD;
responsive to the collision data, determining an occupancy value indicative of an obstacle at the first location; and
determining, based on the occupancy value, an occupancy map indicative of an obstacle at the first location.

9. The method of claim 1, further comprising:
determining a first threshold based at least in part on a first linear velocity and the first location; and
the determining the acoustic event comprising:
determining a value of the first audio data indicative of amplitude that exceeds the first threshold during the first time interval.

10. The method of claim 1, the determining the acoustic event comprising:
determining, based on the first audio data obtained from a microphone on the AMD, first audio spectrum data indicative of amplitude of the first audio data at a first range of frequencies; and
determining a correspondence between the first audio spectrum data and second audio spectrum data.

11. The method of claim 1, the determining the acoustic event comprising:
acquiring the first audio data using a microphone on the AMD; and
processing the first audio data with a machine learning system.

12. An autonomous mobile device (AMD) comprising:
an inertial measurement unit (IMU);
a microphone;
one or more motors;
one or more memories storing computer-executable instructions; and
one or more processors to execute the computer-executable instructions to:
determine a first linear velocity of the AMD at a first time;
determine a first acceleration threshold based on the first linear velocity;
determine, at a second time after the first time and during a first time interval, a first acceleration that is greater than the first acceleration threshold;
determine, based at least in part on the first acceleration being greater than the first acceleration threshold, a motion event during the first time interval;
determine, based on first audio data, an acoustic event during the first time interval; and
determine, based at least in part on the motion event and the acoustic event, collision data indicative of a collision of the AMD with an obstacle.

13. The AMD of claim 12, the instructions to determine the motion event further comprising instructions to:
determine a first angular rate of rotation of the AMD at the first time;
determine that one or more of:
the first linear velocity exceeds a first velocity threshold, or
the first angular rate exceeds a first angular rate threshold; and
determine, at a third time that is within the first time interval and after the second time, one or more of:
a second linear velocity of the AMD between the second time and the third time is less than a second velocity threshold, or
a second angular rate of the AMD between the second time and the third time is less than a second angular rate threshold.

14. The AMD of claim 13, further comprising instructions to:
determine the second velocity threshold based on the first linear velocity; and
determine the second angular rate threshold based on the first angular rate.

15. The AMD of claim 13, further comprising instructions to:
determine a first location of the AMD at a third time during the first time interval; and
determine, based on the first location, one or more of:
the first acceleration threshold,
the second velocity threshold, or
the second angular rate threshold.

16. The AMD of claim 12, further comprising instructions to:
- determine a first location of the AMD at a third time;
- determine a first threshold based at least in part on the first linear velocity and the first location; and
- the instructions to determine the acoustic event comprising instructions to:
  - determine an amplitude of the first audio data during the first time interval exceeds the first threshold.

17. The AMD of claim 12, the instructions to determine the acoustic event further comprising instructions to:
- acquire the first audio data using the microphone;
- process the first audio data with a band pass filter to produce filtered audio data; and
- determine that an amplitude value in the filtered audio data exceeds a first threshold.

18. The AMD of claim 12, the instructions to determine the acoustic event further comprising instructions to:
- acquire the first audio data using the microphone;
- determine, based on the first audio data, a first spectrogram; and
- determine a correspondence between the first spectrogram and a second spectrogram that is associated with the collision.

19. The AMD of claim 12, further comprising:
- a speaker; and
- the instructions to determine the acoustic event further comprising instructions to:
  - determine audio output data presented using the speaker during the first time interval;
  - acquire second audio data from the microphone during at least a portion of the first time interval;
  - perform, using the audio output data, echo cancellation on the second audio data to produce third audio data;
  - determine a first characteristic of the third audio data; and
  - compare the first characteristic with a threshold.

20. The AMD of claim 12, further comprising instructions to:
- stop movement of the AMD;
- determine a first location of the AMD at the first time interval;
- responsive to the collision data, determine an occupancy value indicative of an obstacle at the first location; and
- determine an occupancy map indicative of the obstacle at the first location.

* * * * *